United States Patent Office 3,663,572
Patented May 16, 1972

3,663,572
SUBSTITUTED 4-PROPARGYLOXYMETHYL-
γ-BUTYROLACTONES
Claude P. Fauran, Guy M. Raynaud, and Colette A. Douzon, Paris, and Claude J. Gouret, Meudon, France, assignors to Delalande S.A., Courbevoie, Hauts-de-Seine, France
No Drawing. Filed Aug. 20, 1969, Ser. No. 851,757
Claims priority, application Great Britain, Sept. 17, 1968, 44,025/68
Int. Cl. C07d 5/06
U.S. Cl. 260—343.6      5 Claims

ABSTRACT OF THE DISCLOSURE

A compound of the formula

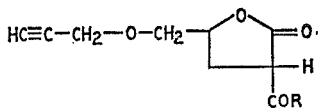

in which R is a straight or branched-chain aliphatic hydrocarbon radical having 1 to 4 carbon atoms, alkoxy, optionally substituted aryl,

in which $R_1$ and $R_2$ are aliphatics having 1 to 4 carbon atoms, or a heterocyclic radical. The compound is prepared by reacting 1-propargyloxy-2,3-epoxy propane with

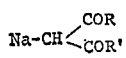

in which R has the same meaning as above and R' is an alkoxy. The compounds possess tranquilizing, analgesic and hypotensive properties.

---

The present invention concerns new substituted 4-propargyloxymethyl-γ-butyrolactones, their process of preparation and their therapeutic application.

The compounds according to the present invention correspond to the following general Formula I:

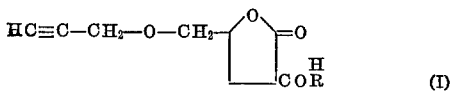

in which R represents a straight or branched-chain aliphatic radical having 1 to 4 carbon atoms; an alkoxy radical; an optionally substituted aryl radical; or a nitrogen atom having its two free valences satisfied by two aliphatic radicals having 1 to 4 carbon atoms, or the nitrogen atom may form part of a heterocyclic radical, e.g. a morpholine, piperidine, pyrrolidine or an azepine radical.

The process of preparing the compounds according to the present invention comprises reacting 1-propargyloxy-2,3-epoxy propane of Formula II

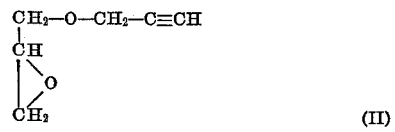

with a derivative of the Formula III

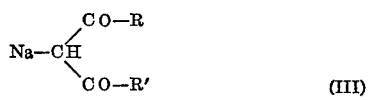

in which R has the same significance as in Formula I and R' is an alkoxy radical.

The following preparations are given as non-limitative examples to illustrate the present invention.

EXAMPLE 1

4-propargyloxymethyl-2-ethoxycarbonyl-γ-butyrolactone 23 g. of sodium are added, with agitation, to 500 cc. of absolute alcohol. After complete formation of the ethylate, 160 g. of ethyl malonate are introduced and the temperature of the mixture is maintained at 55° C. After 30 minutes of contact, 112 g. of 1-propargyloxy-2,3-epoxy propane are progressively introduced and the temperature is maintained, by cooling, between 40 and 50° C. After several hours of contact and returning to normal temperature, the mixture is acidified with 500 ml. of acetic acid and the ethanol is then removed by distillation. The mixture is then taken up in 500 cc. of water and the product formed is extracted with ether. After removal of the solvent, the crude product is obtained which is purified by distillation.

Boiling point = 155–160° C. under 0.01 mm. Hg
Yield = 61%

Elementary analysis.—Calculated (percent): C, 58.40; H, 6.24. Found (percent): C, 58.23; H, 6.09.

EXAMPLE 2

4-propargyloxymethyl-2-acetyl-γ-butyrolactone

To a solution of sodium ethylate obtained by dissolving 23 g. of sodium in 500 ml. of absolute ethanol, there is added 130 g. of ethyl acetylacetate, and then after one hour of contact at normal temperature, 112 g. of 1-propargyloxy-2,3-epoxy propane is added thereto. The temperature is then raised to 50° C. and the mixture is left in contact, with agitation, for several hours. After cooling, the mixture is neutralised with acetic acid and the solvent is removed by distillation. After taking up the residue in water, extracting with ethyl acetate and concentrating the organic phase, the crude product is obtained which is purified by distillation.

Boiling point = 135° C. under 0.1 mm. Hg
Yield = 65%

Elementary analysis.—Calculated (percent): C, 61.21; H, 6.17. Found (percent): C, 61.33; H, 6.41.

EXAMPLE 3

4-propargyloxymethyl-2[N-(dimethyl) carbamoyl]-γ-butyrolactone

To a solution of sodium ethylate obtained by dissolving 4.8 g. of sodium in 150 cc. of absolute ethanol, there is successively added 33 g. of ethyl [N-(dimethyl) carbamoyl] acetate and then 23 g. of 1-propargyloxy-2,3-epoxy propane. After contact for 3 hours at 25° C. the mixture is cooled and neutralized with acetic acid.

The application of the treatment according to the preceding examples permits the isolation of the desired product by distillation.

Boiling point = 170° C. under 0.1 mm. Hg
Yield = 20%

The product obtained crystallises in the cold; it is recrystallised from isopropyl ether.

Elementary analysis.—Calculated (percent): C, 58.65; H, 6.71; N, 6.22. Found (percent): C, 58.73; H, 6.82; N, 6.17.

EXAMPLE 4

4-propargyloxymethyl-2-benzoyl-γ-butyrolactone

To a solution of sodium ethylate obtained by dissolving 12.6 g. of sodium in 200 cc. of absolute ethanol, there is successively added, with agitation, 105 g. of ethyl benzoylacetate and then 56 g. of 1-propargyloxy-2,3-epoxy propane. After several hours of contact at ambient temperature, the mixture is neutralised with acetic acid, the alcohol is removed and the mixture is treated as in the preceding examples. The oily residue obtained is purified by distillation.

Boiling point=200–210° C. under 0.02 mm. Hg
Yield=41%

*Elementary analysis.*—Calculated (percent): C, 69.75; H, 5.46. Found (percent): C, 69.91; H, 5.56.

The compounds according to the present invention have been studied on animals in the laboratory and have been shown to possess tranquilising, analgesic and hypertensive properties.

Tranquilising properties

The compounds according to the present invention inhibit the mortal convulsions provoked by the administration of pentetrazol in mice.

For example, the DE 50 is 100 mg./kg./P.O. of 4-propargyloxymethyl 2-ethoxycarbonyl-γ-butyrolactone.

Analgesic properties

The compounds according to the present invention inhibit the painful stretchings provoked by the intraperitoneal injection of acetic acid in mice.

For example, the protection achieved by 100 mg./kg./P.O. of 4-propargyloxymethyl 2-acetyl-γ-butyrolactone is 45%.

Hypertensive properties

The compounds according to the present invention exercise a progressive and durable hypertensive action on the anaesthetised rat.

The results obtained with two of the compounds according to the present invention are shown in Table I following.

TABLE I

| R | Dose administered, mg./kg./i.v. | Duration of the hypertension, min. |
|---|---|---|
| —CH₃ | 2.5 | 20 |
|  | 2.5 | 30 |

As is shown by the results given above and also in Table II below, the difference between the pharmacologically active dose and the lethal dose is sufficiently great to allow the therapeutic utilisation of the compounds of the general Formula 1.

TABLE II

| R | Dose administered, g./kg./p.o. | Mortality (mice), sp. percent |
|---|---|---|
| —OC₂H₅ | 3.50 | 50 |
| —CH₃ | 3.0 | 50 |
| 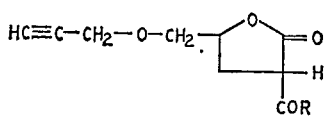 | 2.0 | 0 |

The compounds of the general Formula I can be administered for the treatment of anxiety neuroses, pains and aches (from any source) and cardiovascular depressions with hypotension.

They can be used in the form of tablets containing 50 to 400 mg. of active ingredient, ampoules containing doses of 10 to 200 mg. of active ingredient and drops containing 0.5 to 10% of active ingredient.

What we claim is:
1. A compound of the formula

in which R is selected from the group consisting of alkyl having 1 to 4 carbon atoms, lower alkoxy, phenyl and dimethylamino.

2. A compound according to claim 1, in which R is methyl.

3. A compound according to claim 1, in which R is ethoxy.

4. A compound according to claim 1, in which R is phenyl.

5. A compound according to claim 1, in which R is dimethylamino.

References Cited

Wagner and Zoop: Synthetic Organic Chemistry, Wiley & Sons, N.Y., 1953, p. 534 relied on.

ALEX MAZEL, Primary Examiner

A. M. T. TIGHE, Assistant Examiner

U.S. Cl. X.R.

260—247.2 B, 293.67, 326.8; 424—279